(12) United States Patent
Kaes

(10) Patent No.: US 8,678,179 B2
(45) Date of Patent: Mar. 25, 2014

(54) MULTIPLE LINK CONVEYOR BELT WITH ROLLERS

(75) Inventor: Roland Kaes, Moosham (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/542,254

(22) Filed: Jul. 5, 2012

(65) Prior Publication Data

US 2013/0319824 A1 Dec. 5, 2013

(30) Foreign Application Priority Data

Jun. 5, 2012 (DE) .......................... 10 2012 104 891

(51) Int. Cl.
*B65G 17/24* (2006.01)

(52) U.S. Cl.
CPC ...................................... *B65G 17/24* (2013.01)
USPC .......................................... 198/779; 198/853

(58) Field of Classification Search
USPC .......................................... 198/779, 850–853
See application file for complete search history.

(56) References Cited

U.S. PATENT DOCUMENTS

| | | | |
|---|---|---|---|
| 4,274,536 A | | 6/1981 | Riegler et al. |
| 4,909,380 A | * | 3/1990 | Hodlewsky .................. 198/779 |
| 5,261,525 A | | 11/1993 | Garbagnati |
| 7,578,384 B2 | * | 8/2009 | Fandella ..................... 198/844.1 |
| 7,997,404 B2 | * | 8/2011 | Krisl et al. ..................... 198/779 |
| 8,151,978 B2 | | 4/2012 | Wietling |
| 2007/0039805 A1 | | 2/2007 | Fandella |

FOREIGN PATENT DOCUMENTS

| | | |
|---|---|---|
| DE | 21 50 777 | 4/1973 |
| DE | 35 41 364 A1 | 12/1986 |
| DE | 69204133 | 1/1996 |
| DE | 602005004231 | 1/2009 |
| EP | 1 752 395 B1 | 2/2007 |
| WO | WO2006125331 | 11/2006 |

* cited by examiner

*Primary Examiner* — Mark A Deuble
(74) *Attorney, Agent, or Firm* — Davidson, Davidson & Kappel, LLC

(57) ABSTRACT

A multi link conveyor belt for the transportation of objects like containers, bottles, packs or the like, which is formed of a plurality of pivotally interconnected links. On the upper side of the conveyor belt at least one row of supporting rollers is mounted rotatable, whose axes of rotation are parallel to the joint bolts and to the longitudinal sides of the carriers of the links. Together with the supporting rollers of adjacent links a support plane for the transported objects is formed. In the region of at least one longitudinal side of the links deflection elements are provided, which project between the height levels of the supporting rollers and the upper side of the carriers and at least one side of the supporting rollers.

20 Claims, 17 Drawing Sheets

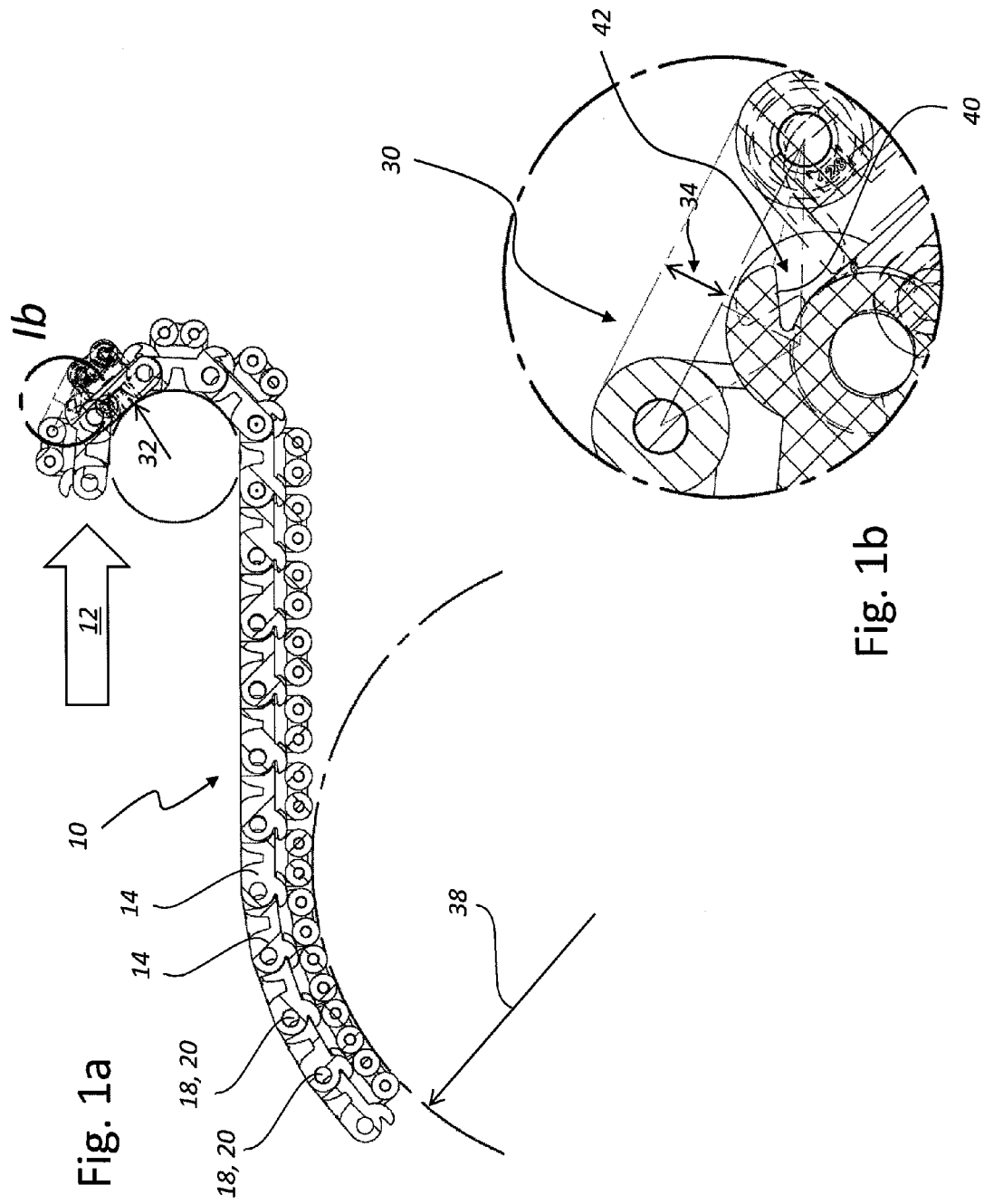

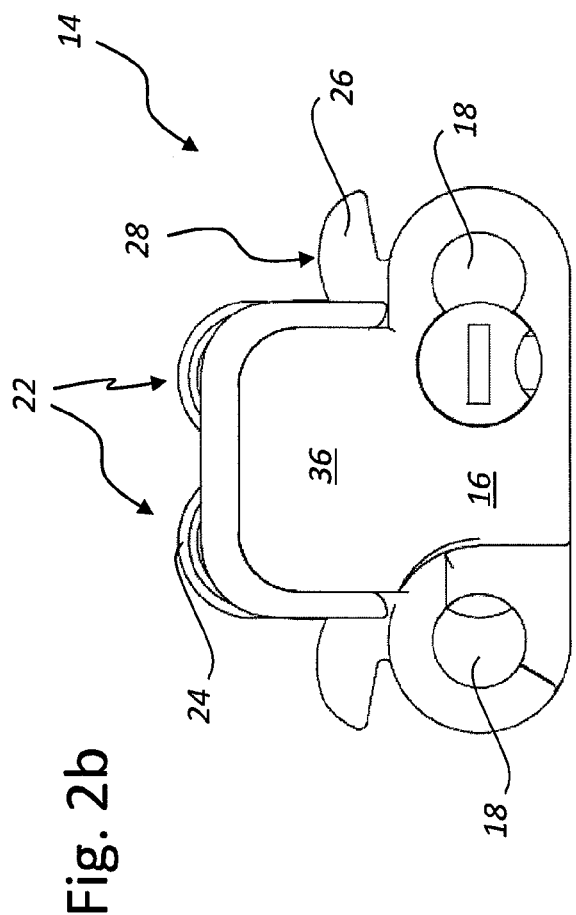
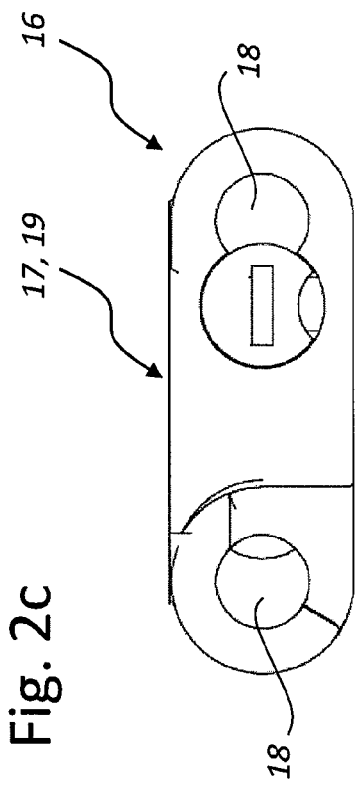

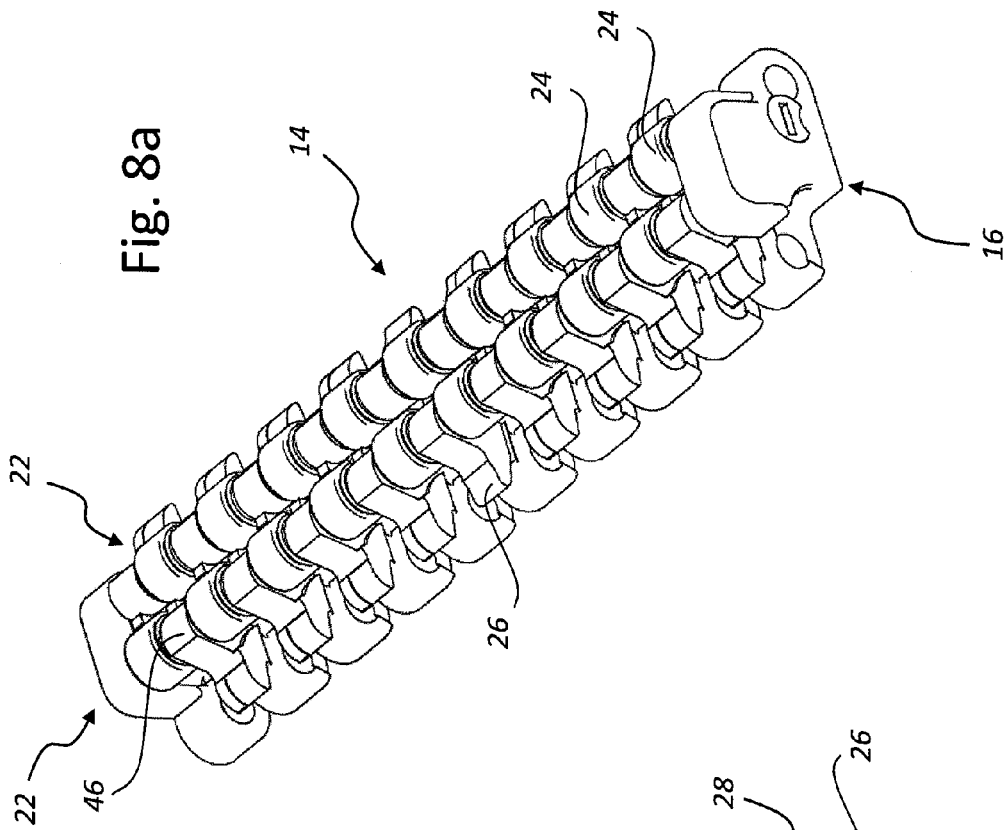
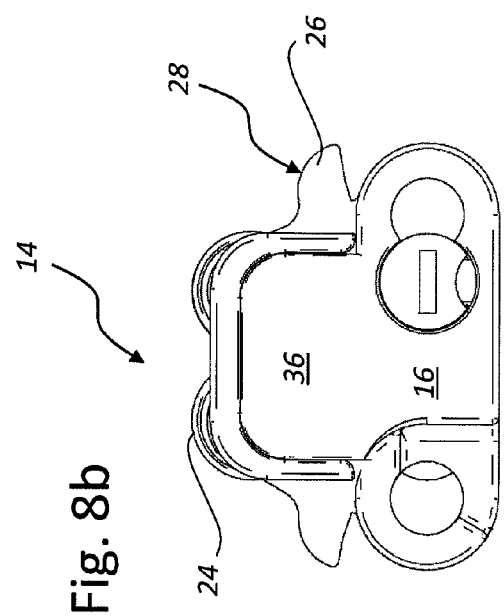

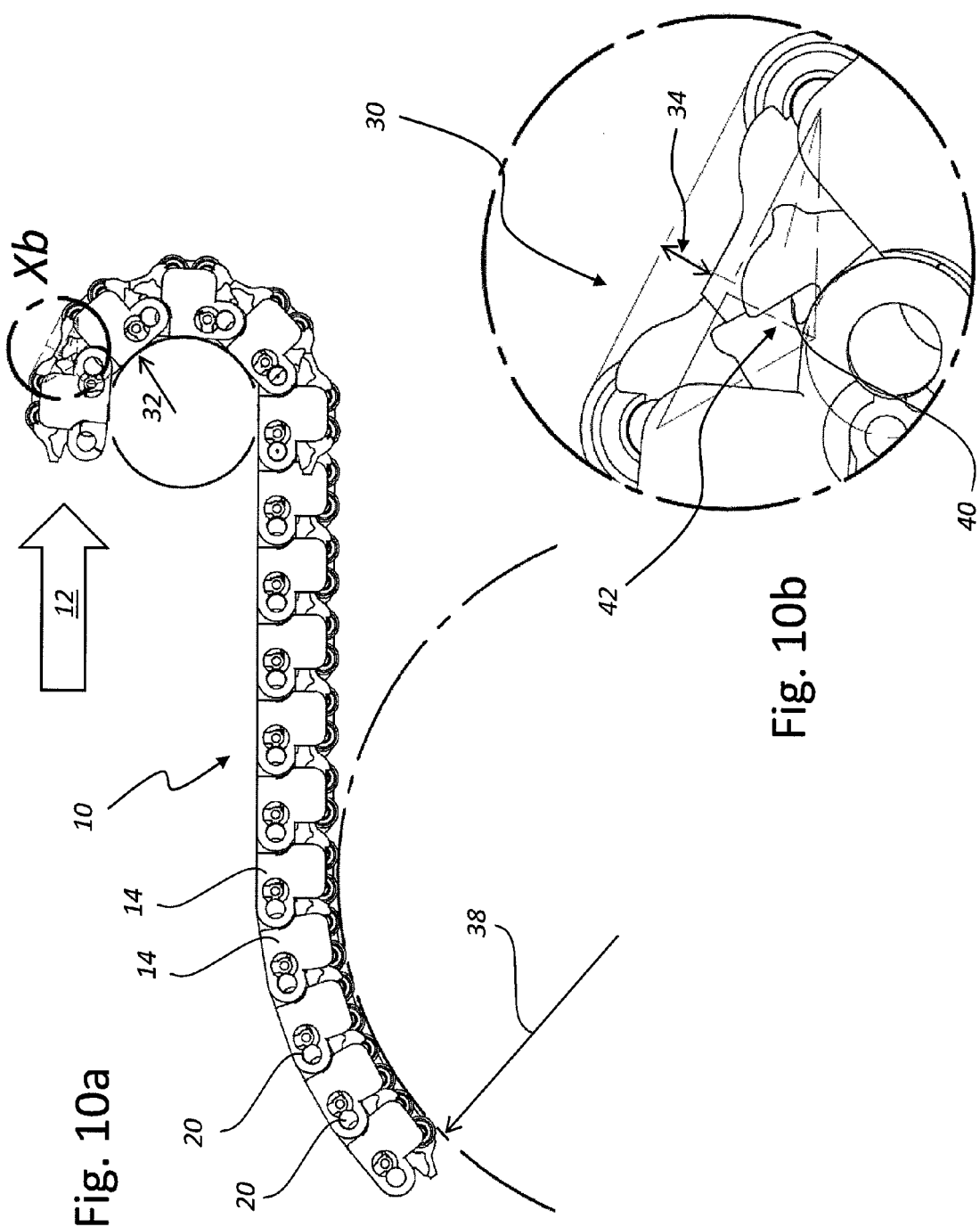

MULTIPLE LINK CONVEYOR BELT WITH ROLLERS

This claims the benefit of German Patent Application DE 10 2012 104 891.6, filed Jun. 5, 2012, and hereby incorporated by reference herein.

The present invention regards a multiple link conveyor belt with running rollers showing the features described in the preamble of the independent claim.

BACKGROUND

For the transport of articles, packs and packaging goods horizontal conveyors are used in numerous variants. A common variant of such a horizontal conveyor comprises so-called link conveyor belts or conveyor chains, whereby the conveyors provide conveying sections with support planes for the delivery of the goods. Several of these conveying sections can border on each other, whereby the link conveyor belts or conveyor chains are formed from a plurality of interconnected articulated chain links or belt links. To use the link conveyor belts or conveyor chains as endlessly circulating traction means, they can be deflected at least in the vertical direction. For a universal application of these bands or chains several aspects are important, e.g. their sufficient mobility, the properties that allow a deflection around horizontally rotating deflection rollers or deflection wheels with a rather small deflection radius. On the other hand, the chains must allow some reverse bending, whereby the conveyor chain is bent concavely in relation to its conveying surface. This is necessary since, depending on the given installation conditions, some multiple diversions might require such reverse bending. Not least, the link conveyor belts or conveyor chains should have a very flat and uniform support plane for transporting products with small base areas without the products tipping over.

For many applications, an anti-slip or smooth surface of the link conveyor belt is hindering, for example if the transported articles need to be backed up. To allow an easy sliding of the articles, the link conveyor belts or conveyor chains can have running rollers or supporting rollers on their conveying plane, on which the articles, containers and packaging materials can easily move in or opposite to the conveying direction. For this purpose, these rollers each have horizontal axes of rotation, which are arranged transversely to the conveying direction. Normally, the rollers are in an elevated level in relation to the supporting hinge parts and chain links, so that the rollers form a substantially uniform support plane.

Such a link conveyor belt is described, for example, in document DE 35 41 364 A1. The link conveyor belt disclosed therein comprises a plurality of pivotally interconnected support links, which each have bearing blocks on their upper sides for receiving axles, whereby rollers are mounted on these axles.

In order to prevent a formation of too large gaps between successive conveying sections of successively arranged link conveyor belts, smallest possible radii of deflection during the guided tours of the conveyor chains are desirable, as gaps might lead to significant conveying problems and tip over problems for some transported articles. Link conveyor belts according to the embodiment described in DE 35 41 364 A1 have rollers, which are arranged above the support links. In narrow deflection radii distinct gaps are formed between the rollers of adjacent support links. In practice this creates a non-acceptable risk during manual intervention in the conveying section of the link conveyor belt. Because of small deflection radii relatively large gaps are formed between the adjacent rows of chain links. When these gaps close during the transition to the horizontal conveying section, this constitutes a risk of injury by crushing. Therefore additional security measures against manual intervention are indispensable.

EP 1 752 395 B1, hereby incorporated by reference herein, discloses a conveyor chain with hingedly interconnected chain links, whereby the chain links each support double rows of running rollers. Additional supporting sections are arranged between the rows of running rollers of each chain link, which largely close the gaps between the adjacent roller rows. However, such supporting sections are absent between adjacent roller rows of adjacent chain links. Therefore there is no protection against manual intervention when a gap opens up because the conveyor chain is guided over a deflection roll.

SUMMARY OF THE INVENTION

It is an object of the present invention to provide a link belt chain or conveyor chain with a support plane formed by running rollers, showing a minimal gap formation between the supporting elements and/or rollers of adjacent, hingedly interconnected individual links in a section of deflecting, showing a convexly curved upper surface in respect to the support plane. Thereby an effective protection against injuries is given, which prevents pinching or crushing during manual intervention in the conveying area of the link conveyor belt.

The present invention provides a multi-link conveyor belt for transporting objects such as containers, bottles, packs, packing goods or the like, whereby the conveyor belt is formed from a plurality of pivotally interconnected links. Each link of the inventive conveyor belt comprises an elongated carrier section or carrier, the lower side forming a supporting section of the conveyor belt. The carrier or carrier section has at least one cylindrical bearing on its two long sides. The carrier or carrier section usually has multiple parallel cylindrical bearings for a hinged connection to adjacent links. The cylindrical bearings of respectively adjacent, interconnected links are each connected via at least one joint bolt, whereby the joint bolt passes through the cylindrical bearings of the two interconnected links. The cylindrical bearings of respectively adjacent, interconnected links are especially connected via at least one joint bolt in such a way, that the adjacent links are pivotally connected around the at least one joint bolt. In addition, each carrier of a link has at least a row of rotatable mounted supporting rollers on its upper side. The axes of rotation or their common axis of rotation is parallel to the joint bolt and parallel to the longitudinal sides of the link carrier. The described supporting rollers together with the supporting rollers of the adjacent links form a support plane for the transported articles.

According to the invention deflection elements are provided in the region of at least one longitudinal side of the links, the deflection elements projecting between the height levels of the supporting rollers or projecting between the upper side of the carrier and at least one side of the supporting rollers. The upper sides of the carriers of the individual links of the conveyor belt also form a so-called basal level. According to the invention this basal level is below the extension height of the deflection elements. The deflection elements allow the deflection of the conveyor band with relatively small deflection radii. Because of the special design of the deflection elements the resulting gaps between the roller rows are closed, although gaps between the supporting rollers of adjacent belt links are still present. The deflection elements, which are arranged between adjacent belt links and which are projecting into or engaging with the gaps, effectively ensure that the depth of the gaps is reduced significantly. As a result, the previously existing danger of injury by an intervention between the links is largely excluded. At the same time, the deflection elements help to obtain a substantially planar support plane, even in the peripheral region of an incipient deflection of the conveyor belt. The deflection elements thereby solve the previously existing conflict, the conflict being the formation of gaps as small as possible while keeping a flat support plane and a deflection radius as small as possible.

In an embodiment of the conveyor belt the deflection elements are formed as hook-like extensions, which project into a region between adjacent links and above the so-called "basal level". Typically these deflection elements are each anchored to a base part or a carrier of a link. Optionally, the deflection elements can also be formed by projecting elongated plates, the elongated plates being mounted or fixed together with single rollers at their axes. Thus, for example, the deflection elements can each be formed by material build-up, projecting between the rollers and/or anchoring there. In addition, the deflection elements can each be provided with projections at the upwardly facing rear sides of the hook-shaped extensions. Thereby the gaps between adjacent roller rows, which are formed during the deflection of the conveyor belt, can be closed even better.

To prevent the formation of any perpendicular gaps, the deflection elements are each spaced apart from each other relatively closely. In particular they may each have the same spacing as individual rollers. Optionally, the deflection elements can in each case engage in and/or project into gaps between adjacent rollers.

A first embodiment of the conveyor belt may provide, that each of its belt links comprises a series of deflection elements on one longitudinal side. Alternatively it can be provided, that each link shows rows of deflection elements on both longitudinal sides. Furthermore combinations of differently designed links are possible.

To provide the best possible protection against unintended interference between adjacent belt links and the associated danger of pinching or crushing, the deflection elements of mutually facing longitudinal sides of neighboring links can interlock, in particular by a succession of alternating deflection elements, which are respectively anchored to adjacent belt links.

There are several other possible embodiments of conveyor belts. The belt links may, for example feature a single row of aligned rollers. Optionally, each link may have two parallel rows of aligned rollers. Other conceivable embodiments of the conveyor belt are possible, in which each link comprises three parallel rows of aligned rollers: In this case, the rollers can also be arranged pairwise behind one another and offset laterally from each other. This results in three parallel rows, which are more closely distanced than would be specified normally by the diameter of the rollers.

Horizontal conveyor devices such as the conveyor belt according to the invention may, under certain circumstances, require multiple deflections. Therefore they should not only be deflectable downward in a convex manner with respect to their upper side. Instead they should also be deflectable in the opposite direction, which can be referred to as so-called reverse bending. In the interests of a small distance to adjacent conveyor belts, the regular deflection should be done with a minimum return radius of about 50 millimeters or even less. Meanwhile the reverse bending radius can be much larger, because there are usually more degrees of freedom for design. According to a preferred embodiment of the present invention, the deflection radius of the conveyor belt is smaller than the reverse bending radius. An embodiment of the invention provides a reverse bending radius of a conveyor belt of up to 250 millimeters, in particular of less than 180 millimeters, more preferably of less than 150 millimeters. Therefore multiple deflections of the conveyor belt below the actual horizontal conveying plane are possible.

Lastly it should be mentioned that the invention relates not only to conveyor belts in accordance with one or more of the previously described embodiments. The invention equally relates to individual belt links of such a conveyor belt.

Besides the mentioned advantages, the conveyor belt according to the invention has other advantages as well. Especially the protection against unwanted manual intervention allows a particularly energy-saving "standby" mode of so-equipped horizontal conveyors. Normally horizontal conveyors are not allowed to be turned off completely, if people have access to the system. A standstill of the conveyor belt is dangerous, because it is associated with the danger of injuries during manual intervention in the conveying section. In the absence of replenishment of promotional goods or other breaks in production the conveyors are usually run at low speed, thereby saving energy. However this is still unfavorable from an energetic point of view. From an energetic perspective it makes more sense, to turn off the conveyors completely during production breaks or during times of lack of supply of transported materials. However, to avoid the associated dangerous start-up situations, conveyors are required, which pose no danger to the persons operating the machinery. The conveyor belt according to the invention fulfills these criteria and can therefore be advantageously used for such conveyor systems, since manual intervention in a stationary conveyor belt poses no more risk of injury.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIGS. 2a, 2b, 2c show three schematic views of a single belt link of a conveyor belt according to FIGS. 1a, 1b, 1d.

FIGS. 8a, 8b show two schematic views of a single belt link of a conveyor belt according to FIGS. 7a, 7b.

FIGS. 10a, 10b show two schematic views of a fourth embodiment of the conveyor belt.

DETAILED DESCRIPTION

Figure 1C:
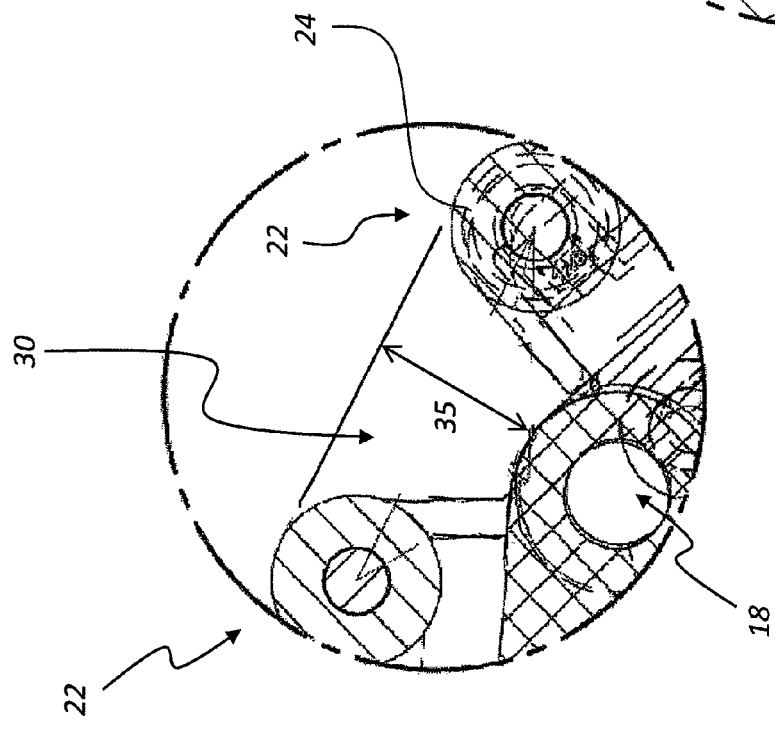
FIGS. 1a, 1b, 1d show three schematic views of a first embodiment of a conveyor belt according to the invention, with FIG. 1c showing solely a comparative example.

The same or equivalent elements of the invention are designated by identical reference characters. Furthermore and for the sake of clarity, only the reference characters relevant for describing the respective figure are provided. It should be understood that the embodiments described are only examples and they are not intended to limit the scope of the disclosure.

The schematic side view of FIG. 1a shows a first embodiment of an inventive multiple link conveyor belt 10, used for the transport of goods like containers or bottles in a horizontal transport direction 12. The conveyor belt 10 is formed from a plurality of pivotally interconnected links 14. The two representations of FIGS. 2a and 2b illustrate that each link 14 of the conveyor belt 10 according to the invention comprises an elongated carrier section or carrier 16; the lower side of the carrier 16 forming a support section of the conveyor belt 10. The two longitudinal sides of the carrier 16 feature at least one cylindrical bearing 18, usually the two longitudinal sides of the carrier 16 feature several parallel cylindrical bearings 18 for the rotationally hinged connection to adjacent links 14. The cylindrical bearings 18 of respectively adjacent, interconnected links 14 are interconnected via joint bolts 20. The joint bolts 20 engage through the cylindrical bearings 18 of the two interconnected links 14 in such a manner, that the adjacent links 14 are pivotally connected via this joint bolt 20 (see FIG. 1a, FIG. 3). cylindrical Furthermore, each carrier 16 of a link 14 comprises two parallel rows 22 of rotatable supporting rollers 24 located on its upper side. The common rotational axes of the supporting rollers 24 are each arranged parallel to the joint bolts 20 and parallel to the longitudinal sides of the carrier 16 of the links 14. Together with the supporting rollers 24 of the adjacent links 14 they form a support plane for the transported goods.

As can be especially seen from the perspective representation of a single belt link 14 shown in FIG. 2a, as well as from the side view of this link 14 according to FIG. 2b, hook-shaped deflection elements 26 are arranged on both longitudinal sides of the links 14; the deflection elements 26 projecting between the height levels of the supporting rollers 24 and projecting between the upper side of the carrier 16 and to both sides of the supporting rollers 24. FIG. 2b particularly shows that the deflection elements 26 project into the section above the cylindrical bearings 18 of the carrier 16 of the link 14. The deflection elements 26 do not protrude over the supporting rollers 24, therefore they do not affect the smooth transportation of the transported goods during movement of the conveyor belts in a horizontal direction 12 (see FIG. 1a). The upward-facing sides 28 of the hook-shaped deflection elements 26 are each convexly curved. This prevents the formation of sharp edges during operation of the conveyor belt 10, especially during the deflection of the conveyor belt 10, which usually leads to the formation of larger gaps 30 between the adjacent links 14. According to the invention the gaps 30 are closed by the deflection elements 26, which interlock between the supporting rollers 24 of adjacent links 14 (see FIG. 3, FIG. 1b).

As can be seen especially from FIG. 1a, the deflection elements 26 permit a deflection of the conveyor belt 10 with relatively small radii of deflection 32. Because of their special design, the deflection elements 26 close the gaps between the roller rows 22, the gaps being formed during the deflection. Thereby the basic dimensions and the width of the gaps 30 remain largely unchanged. But the reduction of the depth of the gaps minimizes the possible depth of engagement during a manual intervention, whereby pinching and crushing of fingers can be largely excluded. Thus, an injury by manual intervention between the links 14 can be largely excluded. Fingers or other objects penetrating into the gaps 30 encounter the upper sides 28 of the deflection elements 26 and are forced away as soon as the deflection elements 26 close the gaps 30 again during the transition of the conveyor belt 10 in the stretched orientation. At the same time the deflection elements 26 contribute in the formation and preservation of a largely plane support plane also in the peripheral sections of an early deflection of the conveyor belt 10.

Figure 2A:
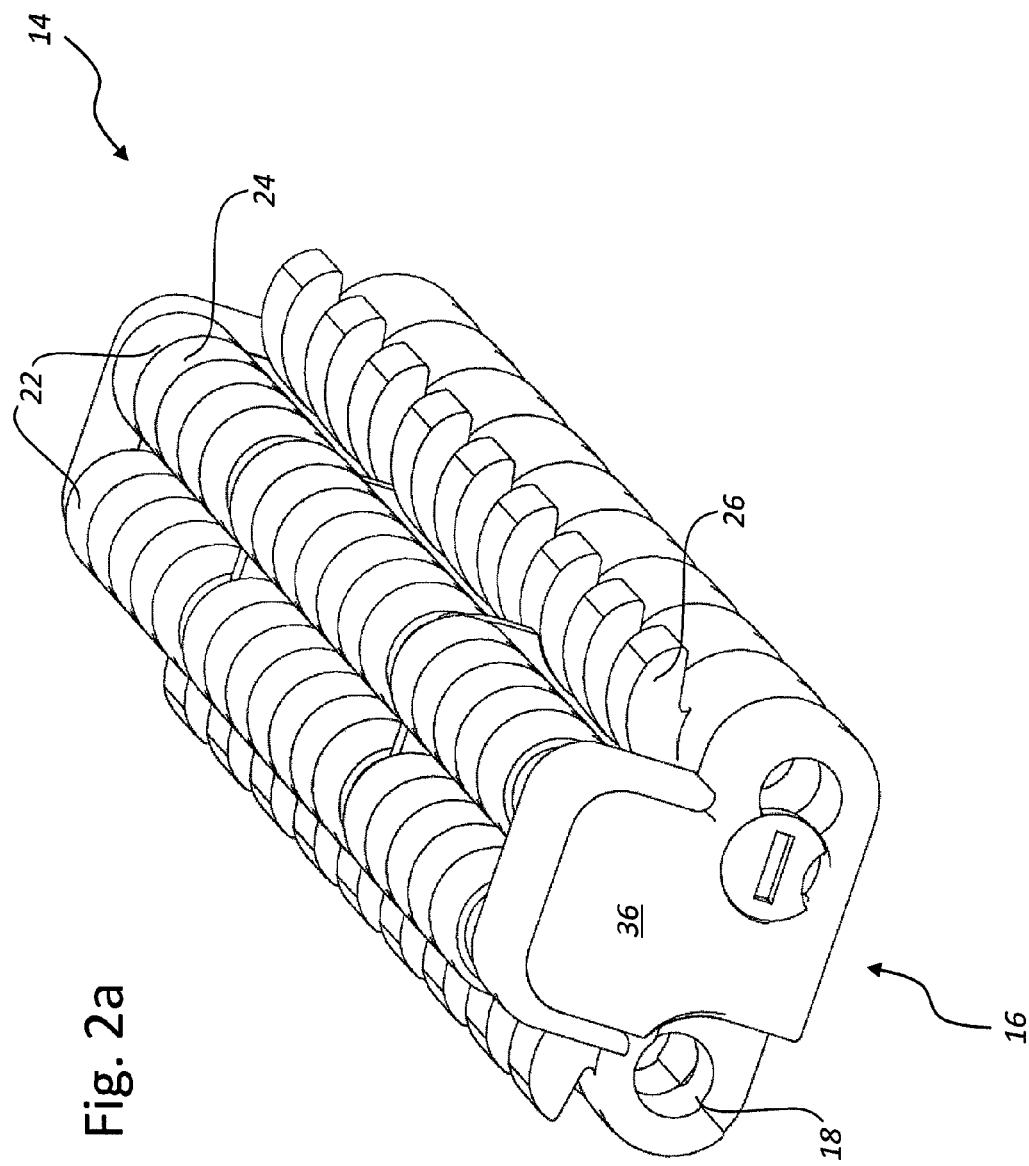

FIG. 1b shows an enlarged representation of section Ib according to FIG. 1a. This illustrates the interlocking of deflection elements 26, which are in each case mutually offset. Thereby the upper sides 28 of the deflection elements 26 form an approximately cylindrical segment-shaped contour. Hereby the gap depth 34 is dramatically reduced compared to a design not using the deflection elements 26. As can be seen in the enlarged representation of FIG. 1c, an enlarged gap depth 35 would result without the deflection elements 26, because of the distance between the connecting tangent of the roller rows 22 of adjacent links 14 and the upper side of the spherical bearing 18. This increased gap depth 35, which would arise according to FIG. 1c without the deflection elements 26. With the deflection elements 26 according to the invention the normally resulting gap depth 35 can be almost halved to a gap depth 34. This can be easily recognized when comparing FIG. 1c and FIG. 1b.

The gap depth 34 resulting from the design and the positioning of the deflection elements 26 can also be seen in FIGS. 4b, 7b, 10b and 13b. These figures show detailed views of respective interacting deflection elements 26 of adjacent links 14 in various embodiments of the conveying belt 10.

As the FIGS. 2a and 2b further illustrate, the deflection elements 26 shown in the first embodiment are part of the carrier 16 and protrude out of the latter obliquely upwards. The carrier 16 with the deflection elements 26, the cylindrical bearings 18 and the bearing plates 36, which are provided on both narrow sides of the carrier 16 to hold the axes of the two roller rows 22 with the running rollers 24, may be made integrally out of plastic, for example. The carrier 16 may be produced by injection molding.

The schematic representation of FIG. 2c illustrates what is meant by the carrier 16 of a link 14. The carrier 16 according to FIG. 2c is a base element or a base body, comprising cylindrical bearings 18 on both longitudinal sides for the articulated connection of several such links 14. According to FIG. 2b two roller rows 22 with running rollers 24 are arranged on the upper side 17 of the carrier 16. The axis of the running rollers 24 are held in the two end shields 36. The carriers 16 (see FIG. 2c) without the end shields 36 and the roller rows 22, which are held in the end shields 36, form a link 14 of the conveyor belt 10 without running rollers 24. As can be seen from the remaining figures such as FIG. 2c, the upper side 17 of each carrier 16 simultaneously forms a basal level 19, above which the roller rows 22 with the running rollers 24 as well as the deflection elements 26 are raised. The roller rows 22 with the running rollers 24 form the highest level of support for the articles, containers, packs, general cargo or the like transported with the conveyor belt 10. According to the invention the deflection elements 26 each exhibit a spatial extension, which is located between the uppermost level of the supporting rollers 24 and the basal level 19 of the upper sides 17 of the carrier 16.

Figure 1D:
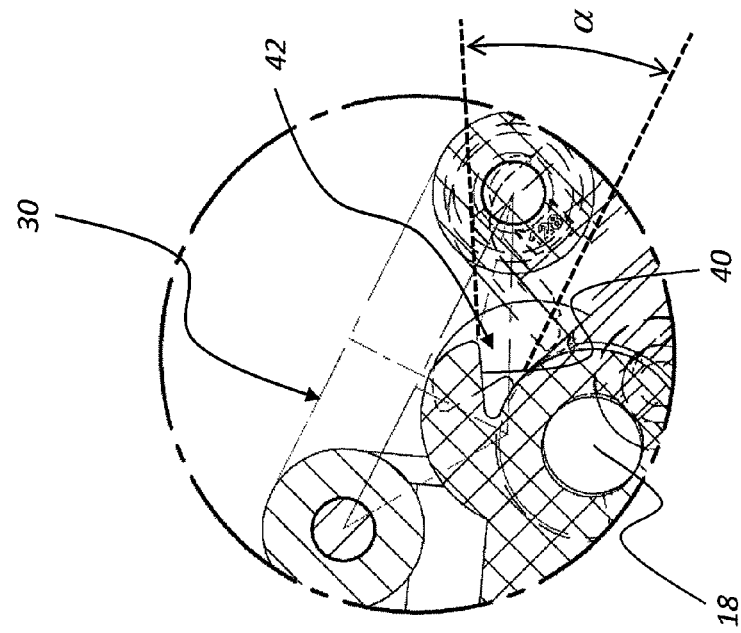
Figure 3:
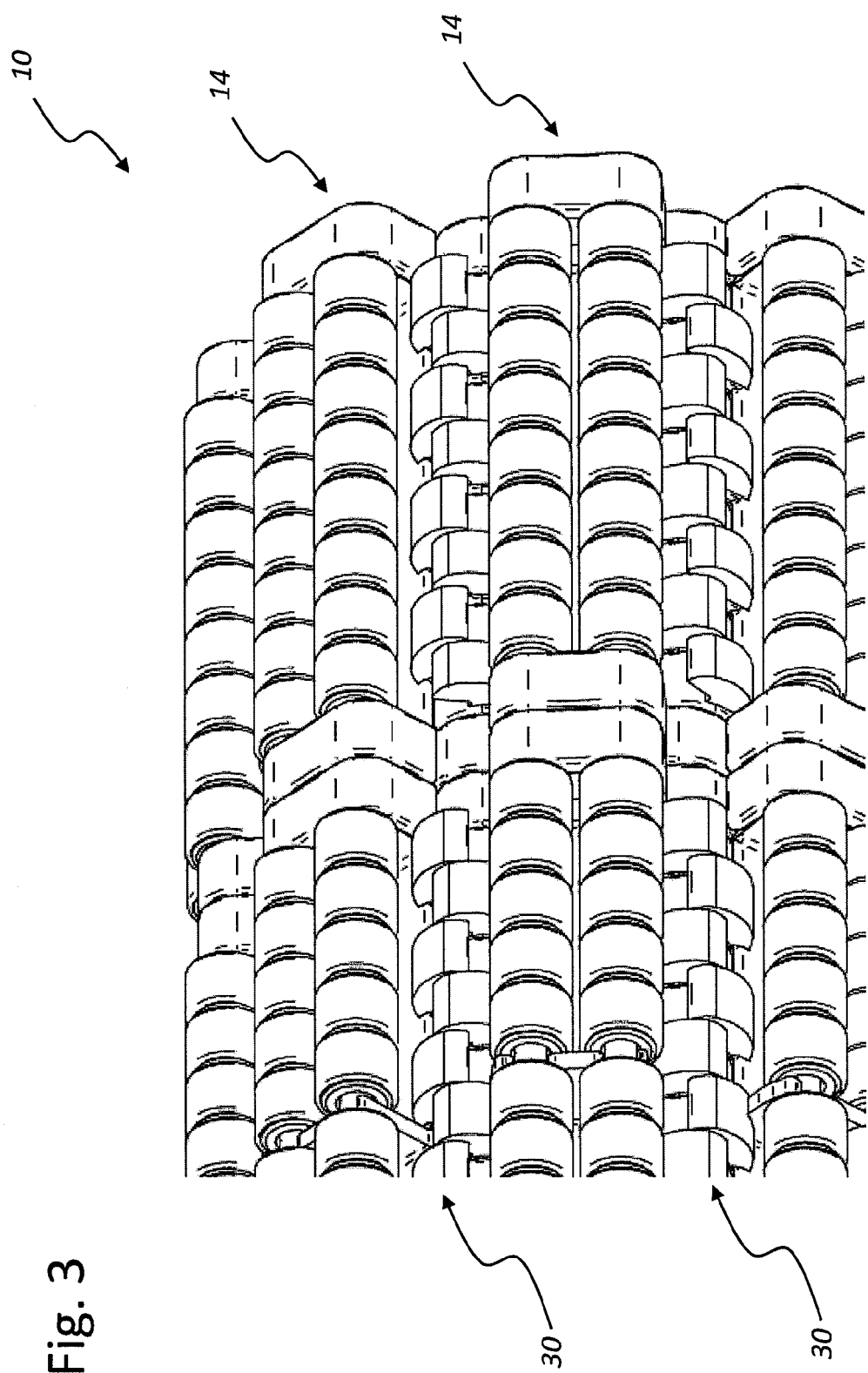
FIG. 3 shows a schematic perspective view of a section of the conveyor belt according to FIGS. 1a, 1b, 1d.
Figure 4:
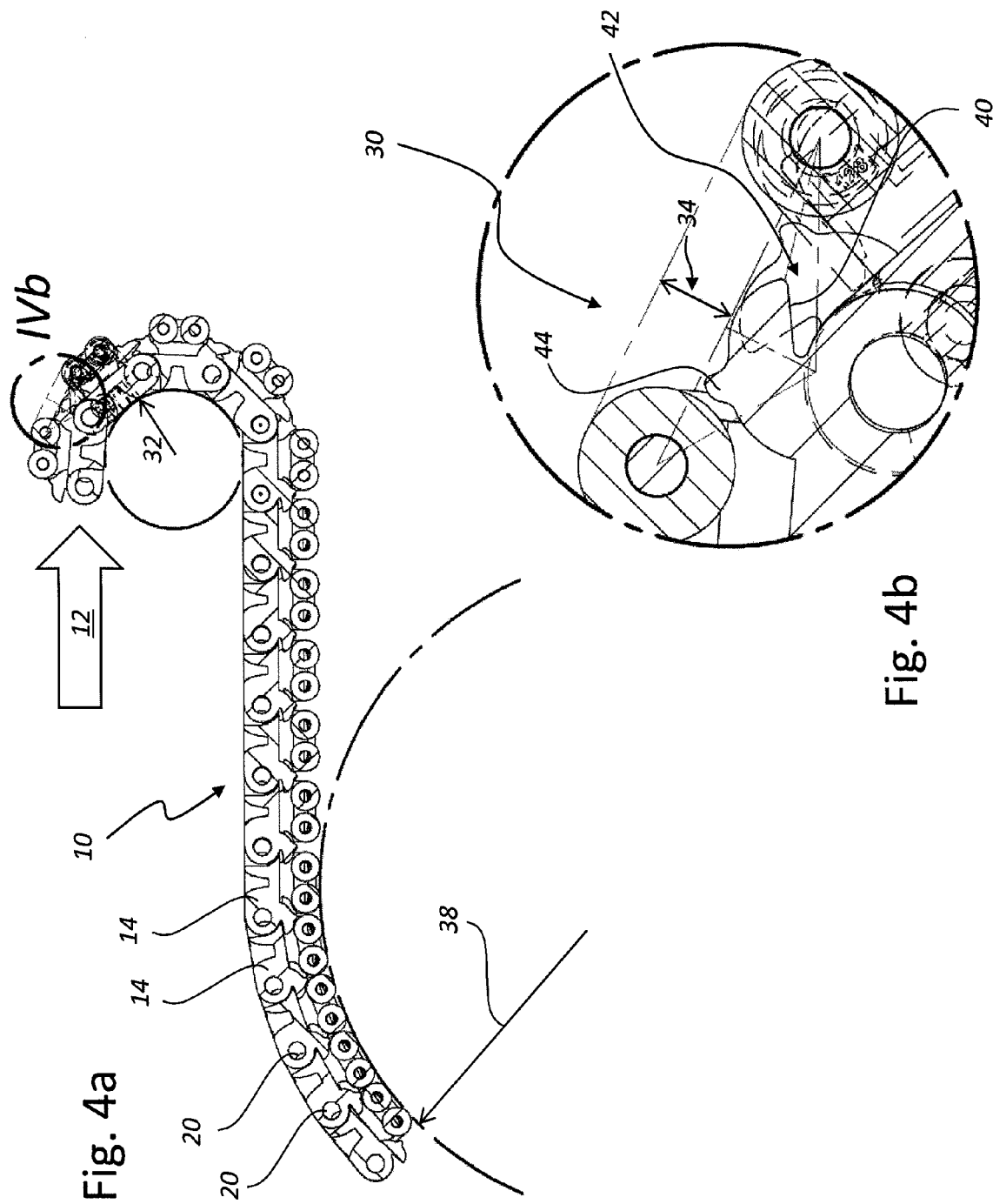
FIGS. 4a, 4b show two schematic views of a second embodiment of the conveyor belt according to the invention.

As the schematic perspective view of FIG. 3 illustrates, which is showing a section of the conveyor belt 10 according to FIGS. 11, 1b, 1d, several such belt segments can be arranged parallel beside each other and form the entire conveyor belt 10.

The side view of FIG. 1a also shows the possibly required reverse bending qualification of the conveyor belt 10, which must be deflected multiple times, if necessary. In the interests of a small distance between adjacent conveyor belts, the regular deflection should be done with a minimum return radius 32 of 50 millimeters or less. The reverse bending radius may be much larger, because there are usually more degrees of freedom for the design. The embodiment of a conveyor belt 10 according to the invention, which is shown in FIGS. 1 to 12, has a reverse bending radius 38 of, for example, less than 150 mm. Thereby multiple deflections of the conveyor belt 10 below the actual horizontal conveying plane are possible. In the illustrated embodiments according to the invention, the deflection radius is in each case significantly smaller than the reverse bending radius of the conveyor belt.

To allow this reverse bending radius 38 to be preferably less than 150 mm, the lower sides 40 of the deflection elements 26 is indented or notched. Thereby the deflection elements 26 limit and define the maximum possible reverse bending angle. The reverse bending angle is limited through the contact between the lower side 40 of the deflection elements 26 with the upper side of the cylindrical bearings 18. The reverse bending angle and thereby the reverse bending radius 38 of the conveyor belt 10 (see FIG. 1a) are defined through the size or width of the notch 42 between the lower side 40 of the deflection elements 26 and the upper side of the cylindrical bearing 18 facing the deflection elements 26.

The detailed view of FIG. 1d shows the opening angle of the notch 42, opening between the lower side 40 of the deflection element 26 and the upper side of the cylindrical bearing 18 at an angle $\alpha$. Depending on the required reverse bending radius 38 this angle $\alpha$ can be between, for example, 5 degrees and approximately 30 degrees. Useful values for the opening angle $\alpha$ are, however, between about 10 and 15 degrees. Identical, similar or different opening angles $\alpha$ can also be provided in the further embodiments of the deflection elements 26 in accordance with FIGS. 4b, 7b, 10b or 13b. For better illustrative purposes the opening angle $\alpha$ is only indicated in FIG. 1d.

Figure 5:
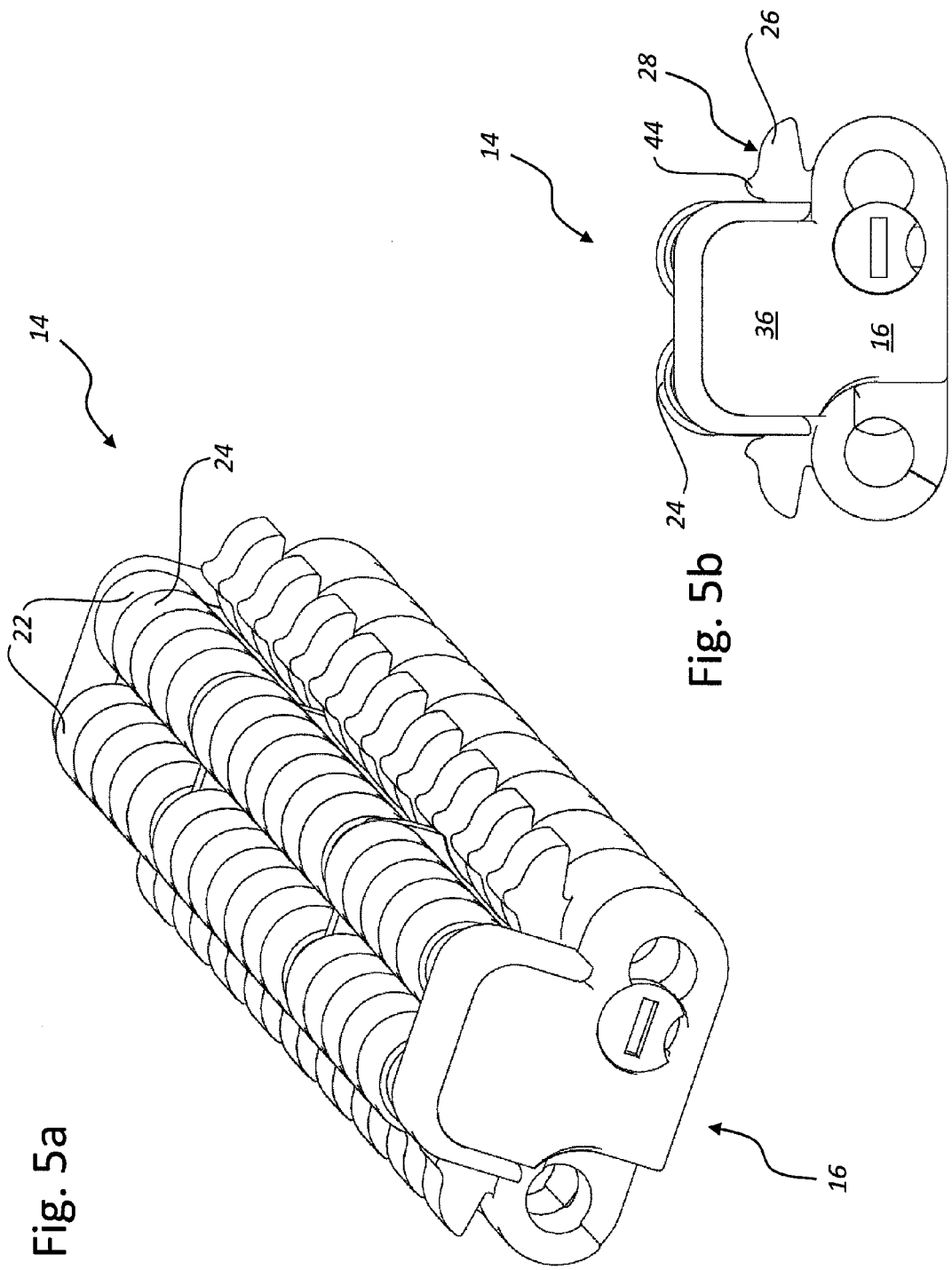
FIGS. 5a, 5b shows two schematic views of a single belt link of a conveyor belt according to FIGS. 4a, 4b.
Figure 6:
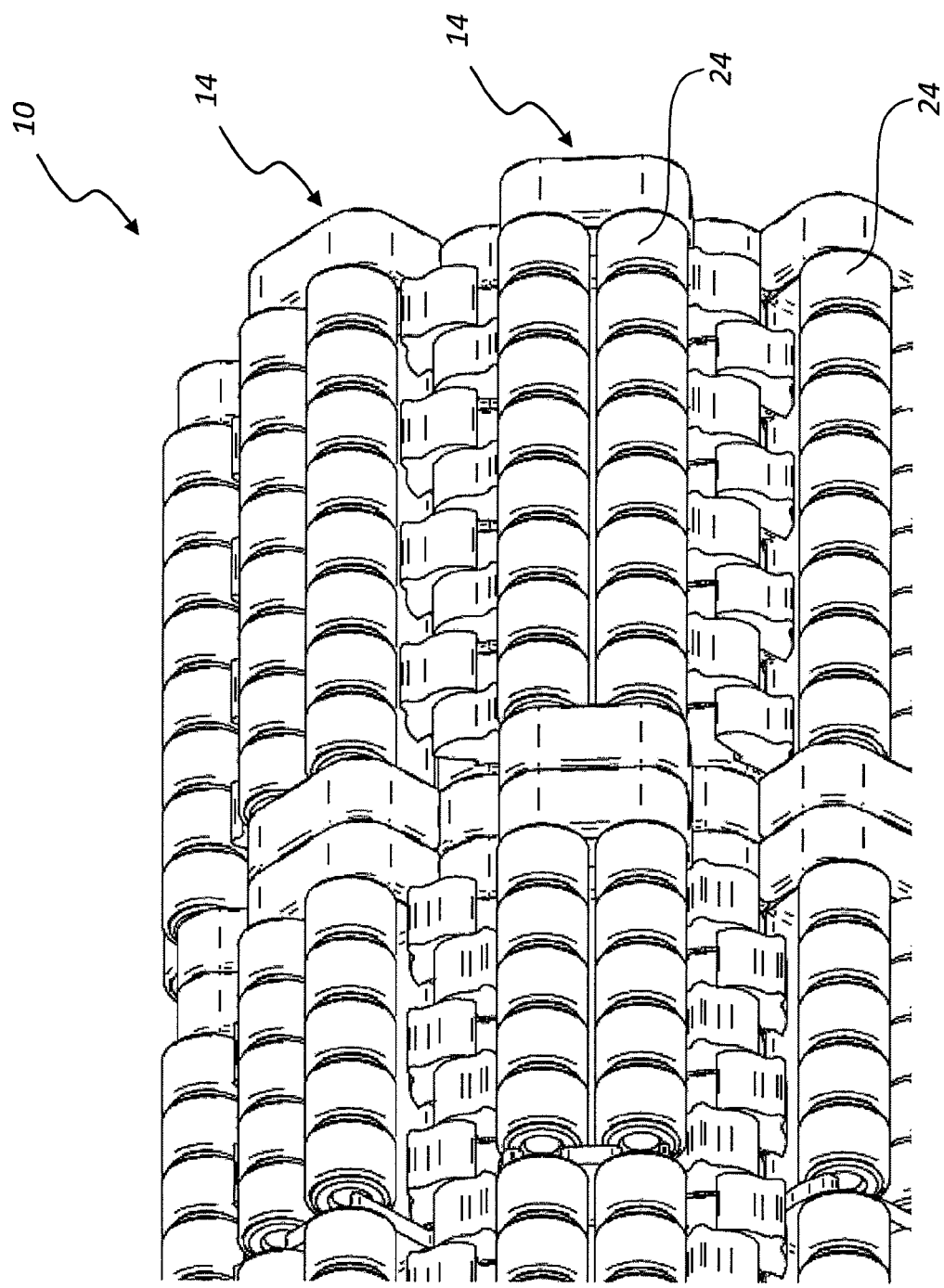
FIG. 6 shows a schematic perspective view of a section of the conveyor belt according to FIGS. 4a, 4b.

FIGS. 4a, 4b show two schematic views of a second embodiment of the conveyor belt 10 according to the invention. FIGS. 5a, 5b show two schematic views of a single belt link 14 of the conveyor belt 10 according to FIGS. 4a, 4b. FIG. 6 shows a schematic perspective view of a section of the conveyor belt 10 according to FIGS. 4a, 4b. The conveyor belt 10 with its single links 14 and their supporting rollers 24 as well as with the arrangement of deflection elements 26 of the second embodiment shown in FIGS. 4a, 4b, 5 and 6 corresponds mainly to the first embodiment shown in FIGS. 1a, 1b, 1d, FIG. 2 and FIG. 3. However, in this second embodiment, the deflection elements 26 are modified slightly. This is illustrated in the detailed view of FIG. 4b (enlargement of the detail IVb from FIG. 4a) as well as in the two representations of FIGS. 5a, 5b. The carriers 16 anchored to the deflection elements 26 are each formed by hook-shaped extensions, as has been shown in the first embodiment. The hook-shaped extensions project into the section between adjacent links 14 and above the basal level of the carrier 16.

As shown in the perspective view of a single belt link 14 according to FIG. 5a and in the side view of the link 14 according to FIG. 5b, hook-shaped deflection elements 26 are arranged on both longitudinal sides of the link 14, projecting between the height levels of the supporting rollers 24 and the upper side of the carrier 16 and projecting to both sides of the supporting rollers 24. On their upper sides 28 the deflection elements 26 each have a hook-shaped projection 44, close to the adjacent supporting roller 24, as can be seen in FIG. 4b. The protection against interference is thereby improved even more, even though the gap depth 34 itself is not changed compared to the first embodiment.

As shown in the embodiment in FIGS. 5a and 5b, the deflection elements 26 are each part of the associated carrier 16 and project diagonally up and out of this carrier 16. The arrangement and dimensioning of the notches 42 on the lower side 40 of the hook-shaped deflection elements 26 largely corresponds to the arrangement and dimensioning described for the first embodiment. This results in equivalent reverse bending properties (see FIG. 4a).

Figures 7A, 7B:
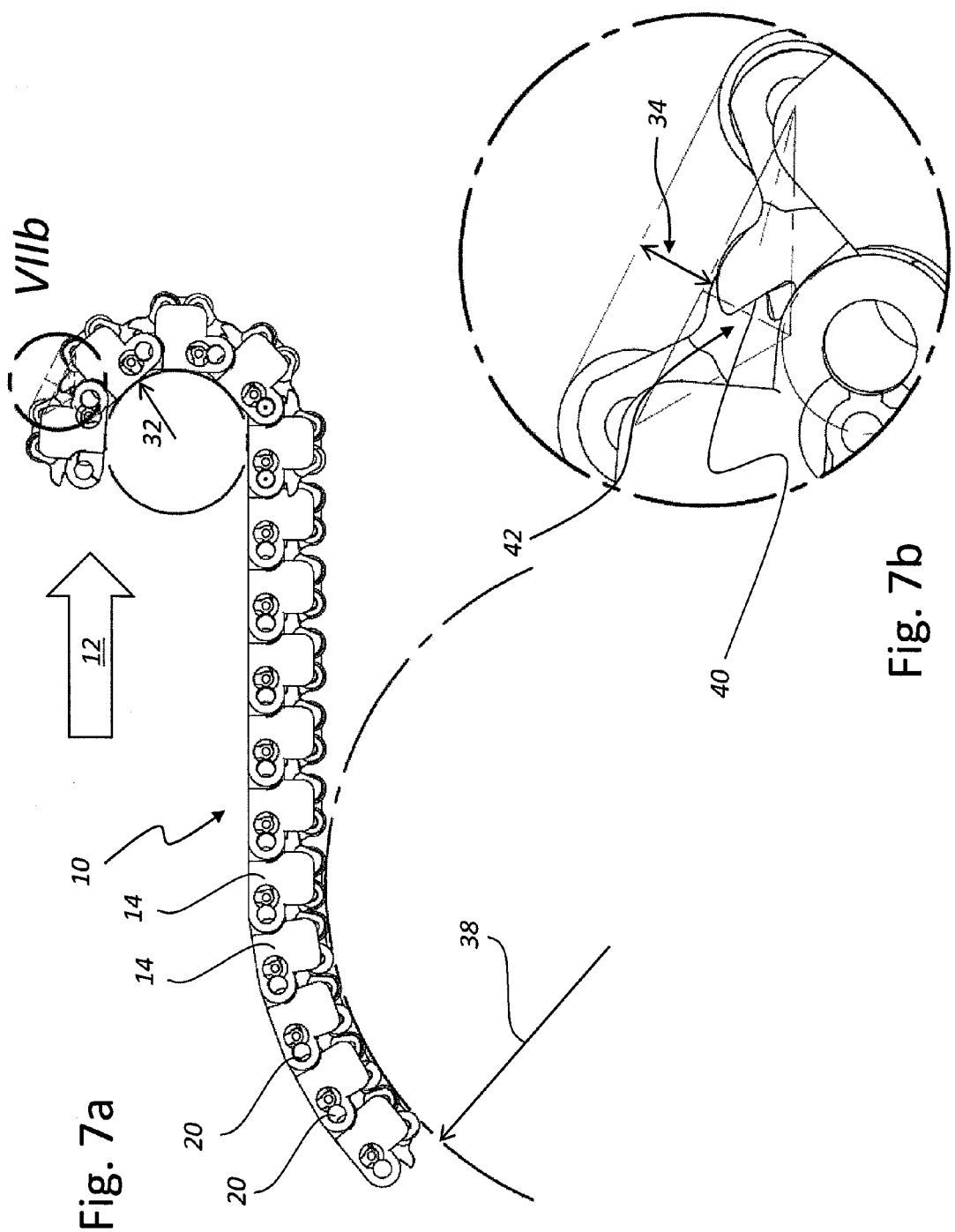
FIGS. 7a, 7b show two schematic views of a third embodiment of the conveyor belt.
Figure 9:
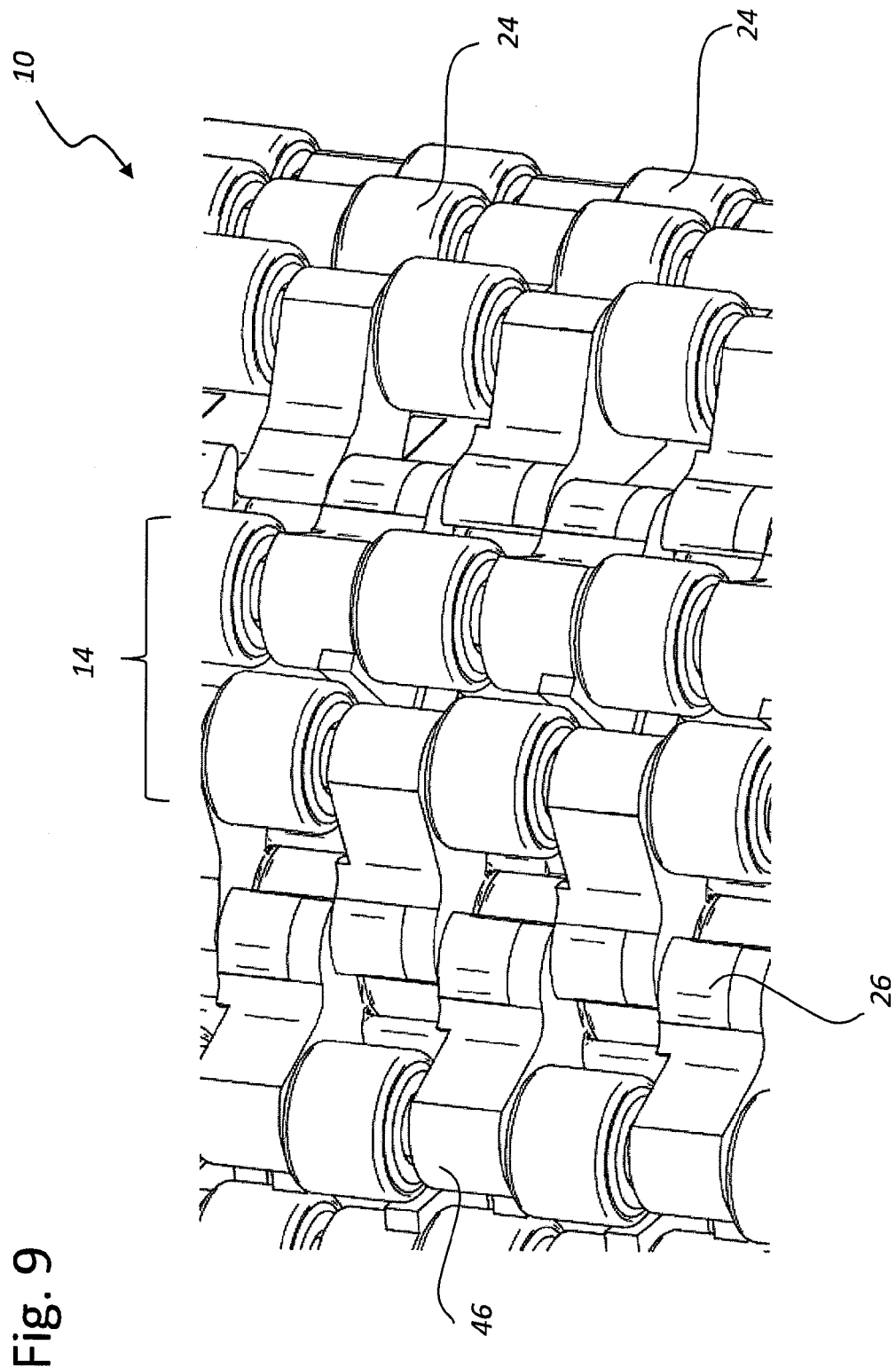
FIG. 9 shows a schematic perspective view of a section of the conveyor belt according to FIGS. 7a, 7b.

FIGS. 7a, 7b show two schematic views of a third embodiment of the conveyor belt 10 according to the invention. FIGS. 8a, 8b show two schematic views of a single belt link 14 of the conveyor belt 10 according to FIGS. 7a, 7b. FIG. 9 shows a schematic perspective view of a section of the conveyor belt 10 according to FIGS. 7a, 7b. The conveyor belt 10 with its single links 14 and their supporting rollers 24 as well as the arrangement of deflection elements 26 corresponds mainly to the embodiments described before. The profile of the deflection elements 26 corresponds mainly to the profile of the deflection elements 26 according to the first embodiment. However, the entire construction of the roller rows 22 and the distances between the rollers 24 is different from the previously shown first and second embodiments. The deflection elements 26 anchored to the carriers 16 are each formed as hook-shaped extensions as has been shown in the first embodiment. The hook-shaped extensions project into the section between adjacent links 14 and above the basal level of the carrier 16 (see FIG. 9). The deflection elements 26 each have one upward-reaching additional extension 46. The extension 46 approximately fills the place of a roller 24 and has about the same width as a roller 24.

As can be seen in particular in the perspective view of FIG. 8a, a deflection element 26 with an upward-reaching extension 46 and a supporting roller 24 are alternately arranged in each roller row 22, wherein the deflection elements 26 and the supporting rollers 24 of the two parallel roller rows 22 are each arranged offset from one another. The extensions 46 thus do not act as support surfaces for the transport of the goods, because their height level is slightly below the height level of the supporting rollers 24. But the extensions 46 fill all gaps, which result from the lack of supporting rollers 24. The extensions 46 may also serve as bearing pedestal for the axes of the supporting rollers 24, so that they are frequently supported. This makes the support plane very stable.

The schematic perspective view of FIG. 9 shows that the supporting rollers 24 together with the deflection elements 26 and their extensions 46 form a very dense structure, leaving almost no gaps that would allow a dangerous manual intervention. The detailed view of FIG. 7b (enlargement of the detail VIIb from FIG. 7a) shows another gap depth 34, which is reduced a little more.

Figure 11A:
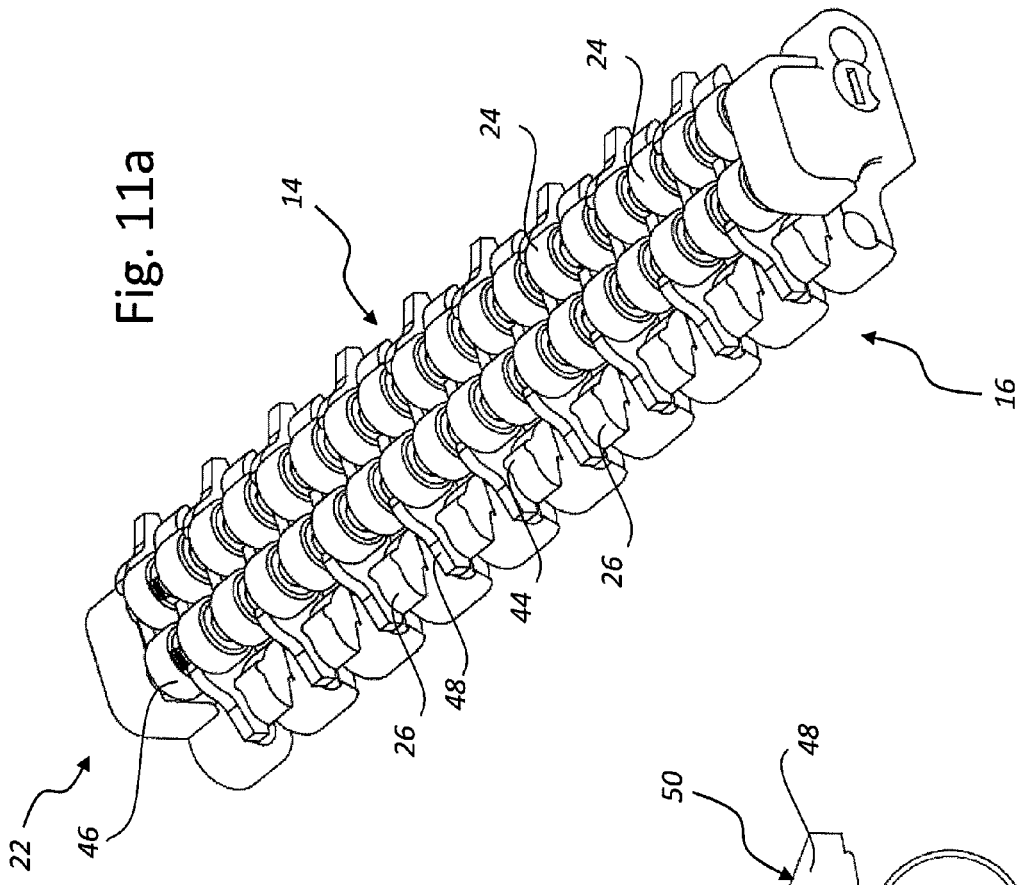
FIGS. 11a, 11b show two schematic views of a single belt link of a conveyor belt according to FIGS. 10a, 10b.
Figure 11B:
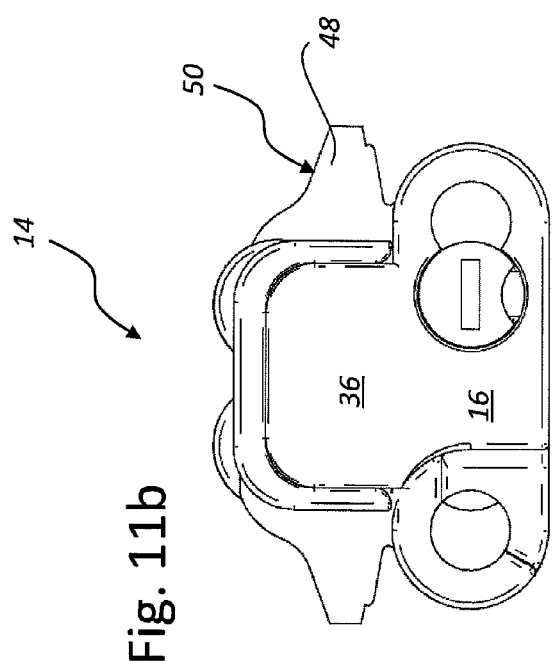
Figure 12:
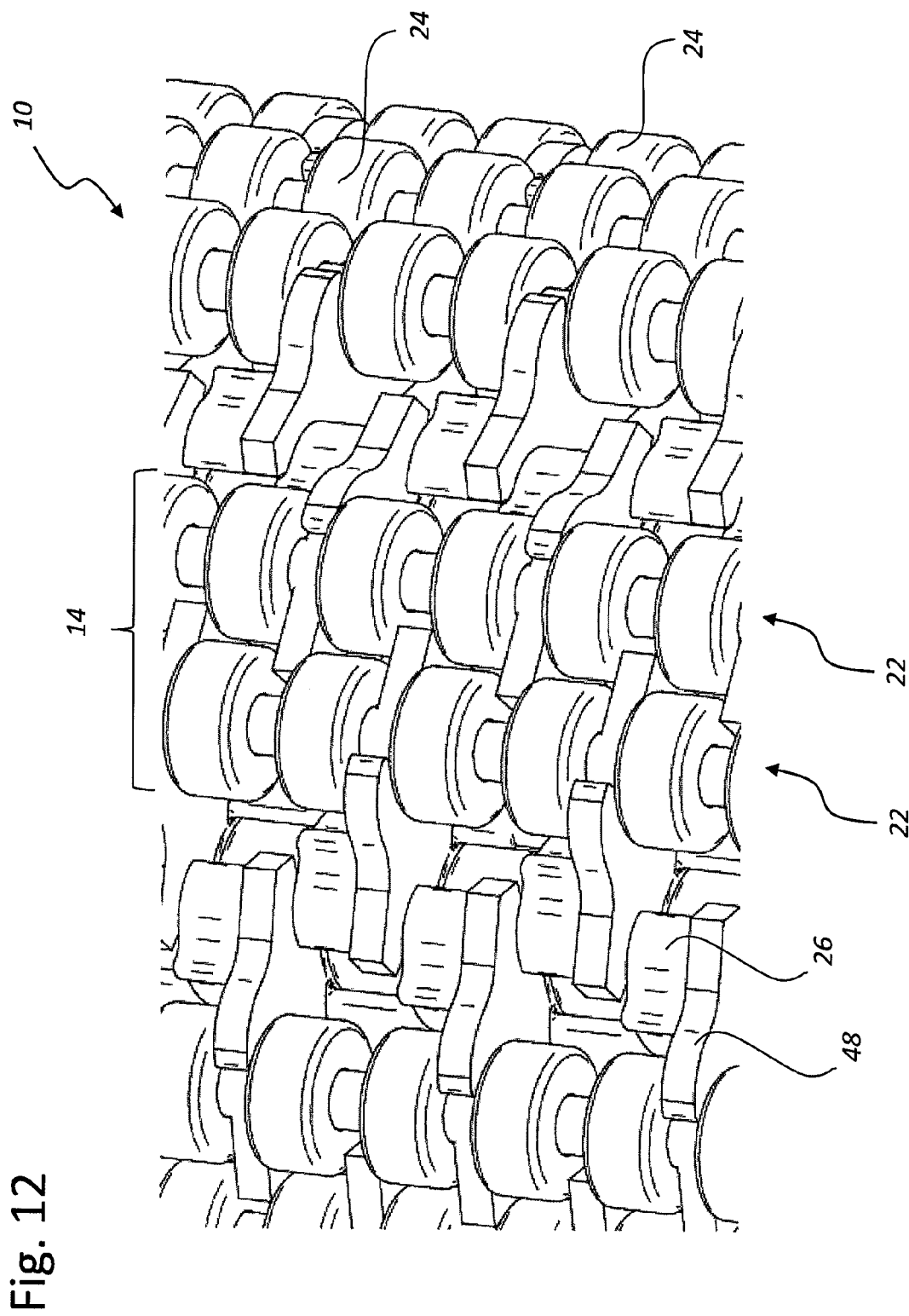
FIG. 12 shows a schematic perspective view of a section of the conveyor belt according to FIGS. 10a, 10b.

FIGS. 10a, 10b show two schematic views of a fourth embodiment of the conveyor belt 10 according to the invention. FIGS. 11a, 11b show two schematic views of a single belt link 14 of the conveyor belt 10 according to FIGS. 10a, 10b. FIG. 12 shows a schematic perspective view of a section of the conveyor belt 10 according to FIGS. 10a, 10b. The conveyor belt 10 with its single links 14 and their supporting rollers 24 as well as the arrangement of deflection elements 26 corresponds mainly to the embodiments described before. The profile of the deflection elements 26 corresponds mainly to the profile of the deflection elements 26 according to the second embodiment (see FIG. 11a, FIG. 5a).

As can be especially seen in the FIGS. 11a and 12, the entire construction of the roller rows 22 and the distances between the rollers 24 differs from the previously shown first, second and third embodiments. As described for the second embodiment, the deflection elements 26 are anchored to the carriers 16 and are each formed as hook-shaped extensions, the hook-shaped extensions projecting into the section between adjacent links 14 and above the basal level of the carrier 16. Additionally the deflection elements 26 have the same projections 44 on their upper sides 28 as described for the second embodiment (see FIG. 5a, FIG. 5b). As can be especially seen in FIG. 11a and 11b, the fourth embodiment additionally comprises guard discs 48. The guard discs 48 are formed as extensions of elongated plates, which are mounted or fastened together with individual running rollers 24 on their axes. The additional guard discs 48 arranged next to each deflection element 26 are formed by material build-up, the material build-up projecting between and/or anchored to the rollers 24. Compared to the upper side of the deflection elements 26, the upper side 50 of the guard discs 48 is more elevated and more gently sloping. This results in a significantly lower total gap depth 34 during the deflection of the conveyor belt 10 (see FIG. 10b, which is an enlargement of detail Xb from FIG. 10a). The danger of manual interference and the protection against injuries is thereby further increased.

As can be seen from the perspective detailed view of FIG. 12, the additional guard plates 48 do not necessarily extend continuously to both sides of the longitudinal sides of the link 14. Instead the additional guard plates 48 may for example just point to one of the longitudinal sides of the link 14 respectively. The rollers 24 of the conveyor belt 10, which are respectively aligned in transport direction 12 (see FIG. 10a), each have such distances from each adjacent rollers 24 of the same roller row 22, that guard plates 48 can be selectively inserted between the adjacent rollers 24. Every second of these gaps between the rollers 24 is occupied, so that an offset of the arrangements of the guard plates 48 is obtained, which can be seen in FIG. 12.

Figures 13A, 13B:
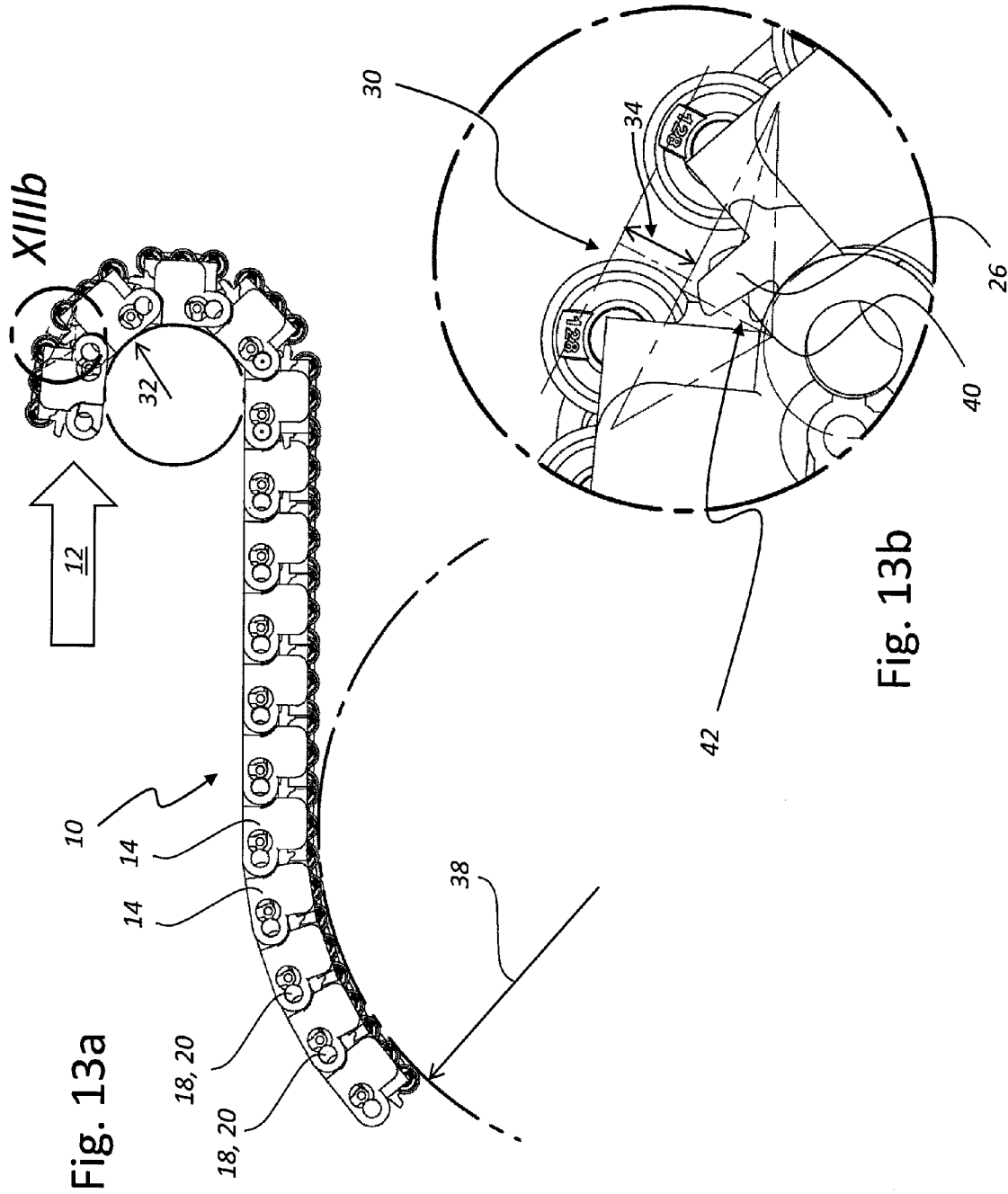
FIGS. 13a, 13b show two schematic views of a fifth embodiment of the conveyor belt.
Figure 14A:
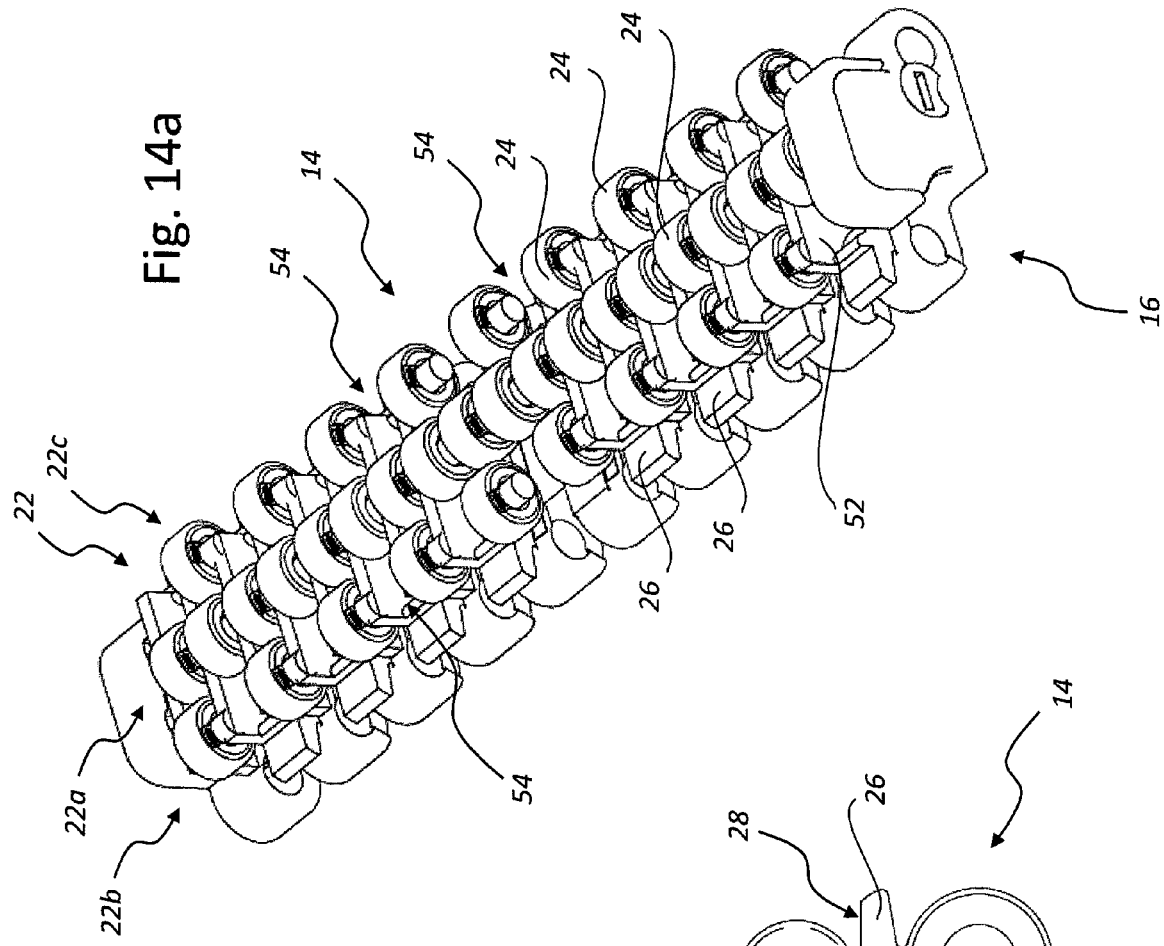
FIGS. 14a, 14b shows two schematic views of a single belt link of a conveyor belt according to FIGS. 13a, 13b.
Figure 14B:
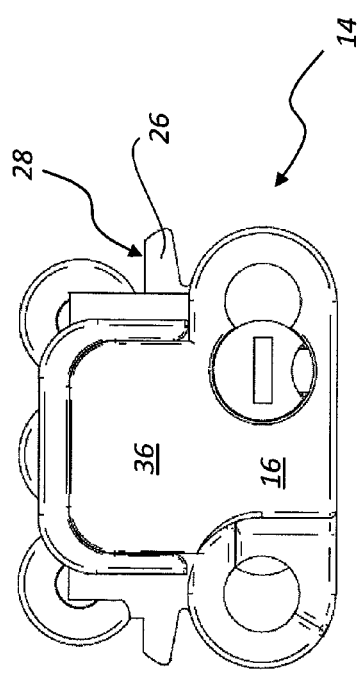
Figure 15:
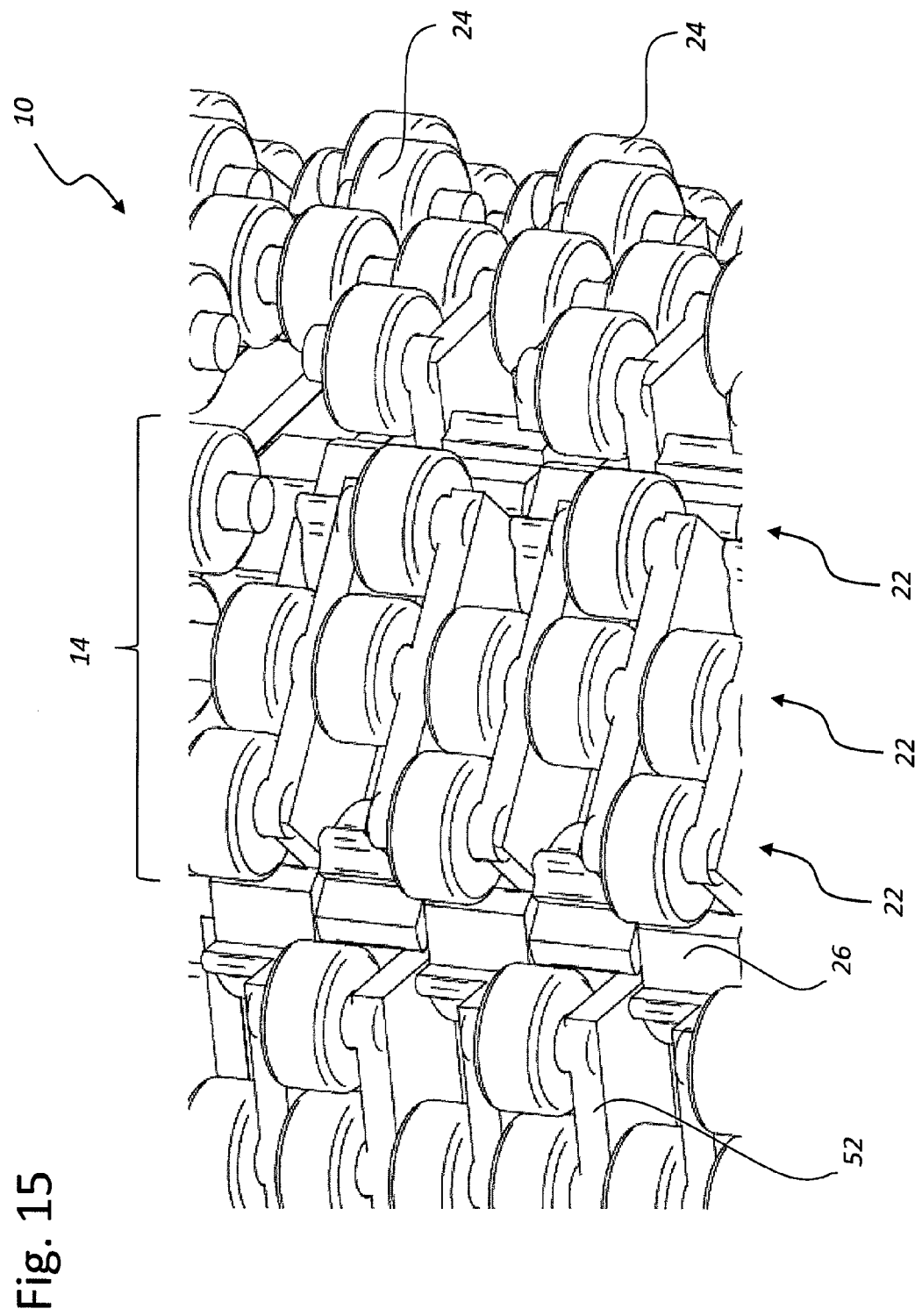
FIG. 15 shows a schematic perspective view of a section of the conveyor belt according to FIGS. 13a, 13b.

FIGS. 13a, 13b show two schematic views of a fifth embodiment of the conveyor belt 10 according to the invention. FIGS. 14a, 14b show two schematic views of a single belt link 14 of the conveyor belt 10 according to FIGS. 13a, 13b. FIG. 15 shows a schematic perspective view of a section of the conveyor belt 10 according to FIGS. 13a, 13b. This fifth embodiment of a conveyor belt 10 shows that principally different configurations of the roller rows 22 are possible. The embodiments described above each have two parallel rows with aligned running rollers 24 or displaced arranged running rollers 24. The fifth embodiment shows three parallel rows 22 of running rollers 24 (see FIG. 14a), which are respectively arranged pairwise aligned one behind the other and alternately offset laterally to one another. This results in three parallel rows 22, which are more closely spaced than normally predetermined by the diameters of the rollers 24.

Hereby the middle row 22a is fully occupied with rollers 24, whereby the distance between the rollers 24 is such, that flat bearing strips 52 can fit between each roller pair of the middle row 22a, the rollers 24 of the two outer rows 22b and 22c being mounted on the bearing strips 52. Not all seats of these outer rows 22b and 22c are occupied. Only every second seat is occupied, resulting in an offset arrangement according to FIG. 14a, which prevents a pronounced gap formation during the deflection of the conveyor belt 10 (see FIG. 15). Each gap 54 without roller 24 in one of the rows 22b or 22c of a link 14 meets a correspondingly placed roller 24 in each adjacent row 22c and 22b of the adjacent link 14.

The regions of the gaps 54 in the outer rows 22b and 22c are respectively occupied with deflection elements 26. The deflection elements 26 in this fifth embodiment have an upper side 28 showing a flat and not arched design.

The schematic detail view of FIG. 13b (enlargement of detail XIIIb of FIG. 13a) illustrates, that the supporting rollers 24 with the flat, tongue-like deflection elements 26 form extremely narrow gaps 30, in which the gap depth 34 is greater than in the previously described embodiments. However, the gap width is so small, that manual intervention in the gaps 30 during deflection of the conveyor belt 10 is almost impossible.

The invention has been described with reference to preferred embodiments. To the expert it is also conceivable, however, to make changes and modifications without leaving the scope of protection of the appended claims. The bearings instead may be spherical bearings.

LIST OF REFERENCE NUMERALS 10 conveyor belt
12 transport direction
14 belt link, link
16 carrier
17 upper side (of the carrier)
18 cylindrical bearing
19 basal level
20 joint bolt
22 row, roller row
22a middle row
22b, 22c outer row
24 roller, supporting roller, tracking roller
26 deflection elements
28 upward-facing side, upper side
30 gap
32 deflection radii
34 gap depth
35 increased gap depth
36 bearing plate
38 reverse bending radius
40 lower side
42 notch
44 hook-shaped projection
46 hook-shaped extension
48 guard disc, material build-up
50 upper side
52 bearing strips
54 gap
α opening angle

What is claimed is:

1. A multiple link conveyor belt for transporting objects comprising:
a plurality of pivotally interconnected links, each link comprising an elongated carrier, an underside of the carrier forming a supporting section of the conveyor belt, the carrier furthermore comprising parallel bearings on both longitudinal sides for a rotationally articulated connection to adjacent links, the bearings of adjacent, interconnected links being connected in each case via at least one joint bolt passing through the bearings of two interconnected links, the bearings being connected in such a way that the adjacent links are pivotally connected around the at least one joint bolt, each carrier of a link having at least one row of supporting rollers mounted rotatably on an upper side, axes of rotation of the supporting rollers being parallel to the joint bolt and to longitudinal sides of the carrier of the link, the supporting rollers forming a support plane for the transported objects together with the supporting rollers of the adjacent links; and deflection elements in a region of at least one longitudinal side of the links, projecting between height levels of the supporting rollers and an upper side of the carriers and at least one side of the supporting rollers.

2. The conveyor belt as recited in claim 1 wherein the deflection elements are each formed as hook-shaped extensions projecting into a region between adjacent links and above a basal level.

3. The conveyor belt as recited in claim 1 wherein the deflection elements are each anchored to the carrier of a link.

4. The conveyor belt as recited in claim 2 wherein the deflection elements are each provided with elevations on the rear sides of the hook-shaped extensions facing the supporting rollers in the upward direction.

5. The conveyor belt as recited in claim 1 wherein the deflection elements are each formed by a material build-up, projecting between the rollers or being anchored to the rollers.

6. The conveyor belt as recited in claim 1 wherein the deflection elements each have the same spacing distance as between individual rollers of the rollers.

7. The conveyor belt as recited in claim 1 wherein the deflection elements each reach or project into the gaps between adjacent rollers.

8. The conveyor belt as recited in claim 1 wherein each link comprises a row of deflection elements on one longitudinal side.

9. The conveyor belt as recited in claim 1 wherein each link comprises rows of deflection elements on both longitudinal sides.

10. The conveyor belt as recited in claim 1 wherein the deflection elements of mutually facing longitudinal sides of adjacent links interlock with each other.

11. The conveyor belt as recited in claim 1 wherein each link comprises two parallel rows of running rollers, the running rollers being respectively aligned.

12. The conveyor belt as recited in claim 1 wherein each link comprises three parallel rows of running rollers, the running rollers being respectively aligned.

13. The conveyor belt as recited in claim 1 wherein the conveyor belt has a reverse bending radius of maximum 250 millimeters.

14. The conveyor belt as recited in claim 1 wherein the conveyor belt has a reverse bending radius of maximum 180 millimeters.

15. The conveyor belt as recited in claim 1 wherein the conveyor belt has a reverse bending radius of maximum 150 millimeters.

16. A single link of a conveyor belt, the single link comprising:

an elongated carrier, an underside of the carrier forming a supporting section of the conveyor belt, the carrier furthermore comprising parallel bearings on both longitudinal sides for a rotationally articulated connection to adjacent links of the single link, other bearings of an adjacent, interconnected link being connected in each case via at least one joint bolt passing through the cylindrical bearings of the single link, the bearings and other bearings being connected in such a way that the adjacent link is pivotally connected around the at least one joint bolt to the single link, the carrier having at least one row of supporting rollers mounted rotatably on an upper side, axes of rotation of the supporting rollers being parallel to the joint bolt and to longitudinal sides of the carrier of the link, the supporting rollers forming a support plane for the transported objects together with the supporting rollers of the adjacent links; and deflection elements in a region of at least one longitudinal side of the link, projecting between height levels of the supporting rollers and an upper side of the carrier and at least one side of the supporting rollers.

17. A container, bottle, or pack conveyor belt comprising the conveyor belt of claim 1.

18. A method for conveying comprising moving the conveyor belt of claim 1 to transport containers, bottles or packs.

19. The method as recited in claim 18 wherein the deflection elements project into gaps between adjacent rows of rollers formed during a deflection.

20. The method as recited in claim 19 wherein the belt undergoes both a return with a return radius and a reverse bend with a reverse bending radius, the deflection being during the return.

* * * * *